United States Patent

[11] 3,608,582

[72] Inventor Alfred W. Lambert
  Somerset, England
[21] Appl. No. 855,141
[22] Filed Sept. 4, 1969
[45] Patented Sept. 28, 1971
[73] Assignee Exactor Sterling Limited
  Crewkerne, Somerset, England
[32] Priority Sept. 11, 1968
[33] Great Britain
[31] 43111

[54] VALVED FLUID COUPLING
  20 Claims, 6 Drawing Figs.
[52] U.S. Cl. .................................................. 137/595,
  137/614.02
[51] Int. Cl. .................................................. F16k 11/10
[50] Field of Search ........................................ 137/594,
  595, 614.02, 614.03, 614.04; 285/1, 314, 315,
  316, 131, 137; 251/148, 340

[56] References Cited
UNITED STATES PATENTS

| | | | |
|---|---|---|---|
| 2,359,648 | 10/1944 | Jones | 137/594 |
| 2,637,572 | 5/1953 | Bruce | 251/340 X |
| 2,693,338 | 11/1954 | Grunt | 251/340 |
| 2,991,090 | 7/1961 | De Cenzo | 137/614.02 |
| 3,166,343 | 1/1965 | Wittren | 285/1 |
| 3,411,537 | 11/1968 | Gladstone et al. | 137/595 X |
| 3,509,515 | 4/1970 | Acord | 285/316 X |

*Primary Examiner*—Henry T. Klinksiek
*Attorney*—Baldwin, Wight and Brown

ABSTRACT: A coupling for connecting together twin fluid lines, for example for connecting two sources of fluid pressure between a tractor and a trailer. The coupling has co-operating first and second parts each part having two fluid passages and sealing valves therein. The parts are arranged to be locked together, and means are provided for opening the valves after the two parts have been locked together, and for closing the valves before the coupling is broken.

Inventor:
Alfred W. Lambert
By Baldwin, Wight, Diller & Brown
Attorneys

VALVED FLUID COUPLING

This invention relates to fluid couplings and is more particularly related to fluid couplings for connecting twin fluid lines. The word "twin" used herein is intended to mean two lines which can be broken by a single coupling. Such twin lines are sometimes used for example, for connecting two sources of fluid pressure from a tractor vehicle to a trailer, one hydraulic line providing a source of high-pressure power for charging the other fluid line which provides operating fluid for the trailer brakes, and the invention is particularly although not exclusively applicable for such use.

According to the present invention a coupling for twin fluid lines comprises cooperating first and second parts and means for locking them together, each part having two fluid passages with sealing valves, and means for opening the valves after the two parts have been locked together.

This arrangement ensures that the sealing valves in the two parts are not prematurely opened when connecting the parts together and fluid loss is prevented when the parts are disconnected because the valves can be closed prior to the joint being "broken."

Preferably the locking means also acts to operate the valves and in a convenient arrangement movement of the locking means initially acts to lock the first and second parts together and then upon further movement actuates the valves.

In a convenient construction each part comprises a longitudinally extending housing in which the passages and valves are provided, each valve being actuated by an operating member which projects from a longitudinal side of the housing.

Preferably the operating members for each housing project from displaced opposite sides thereof.

Thus, the valves may be tilt valves actuated by plungers the axes of which may extend substantially transversely across the housings. In this case the stem of the tilt valve may be received in a recess in a spool connected to the plunger.

In a preferred construction the cooperating parts are male and female and the locking means comprises a sleeve carried by one of the parts which is moveable over the other parts to hold moveable locking members on the female part in positions in which they engage the male part.

With this arrangement the locking members may be provided by locking balls which are carried in an engagement flange on the female part, from both sides of which they project to enable engagement by the sleeve and with the male part respectively.

The sleeve may therefore also be moveable to a position in which it also engages the valve-operating members and to assist operation the sleeve preferably has two displaced inclined faces in its bore which engage and operate the valve-operating members.

Means may be included for locating the sleeve in its position in which it holds the valves open, and also when in a withdrawn inoperative position in which it does not operate the valves or actuate the locking members.

With this arrangement the sleeve may be arranged to extend over and protect the operating members in the part on which it is provided when it is in its withdrawn inoperative position and the part on which the sleeve is not provided may have a shield which extends over the operating members and within which the sleeve can slide to its operative positions.

Preferably means are included for ensuring that the appropriate fluid passages are connected together on both parts and to this end interconnecting location means can be provided on the two parts to ensure that the parts can only be connected in a predetermined relationship.

In any case, at least one of the cooperating parts preferably has means for interconnecting the two fluid passages therein.

In this respect a valve may be provided between the passage which is operated when the coupling between the parts is made.

Preferably the valve is closed when the parts are connected and manually operable means for holding the valve closed when the parts are disconnected may also be incorporated.

This arrangement is particularly useful when the part having the interconnecting valve is provided on, for example, a trailer as set forth above, the connection of the fluid passages causing the brakes of the trailer to be applied.

Preferably one of the parts is carried in a mounting which can pivot about a vertical axis, and the two fluid passages are arranged one above the other at the point where they are adapted for connection to appropriate fluid lines, thus preventing the lines becoming entangled and strained due to relative sideways movement between, for example, a towing vehicle and a trailer.

Means may also be provided for preventing or restricting spillage of fluid from the open ends of the lines beyond the valves, such as could occur when the coupling is disconnected, especially if these portions of the lines are long, the means conveniently comprising porous discs situated in these passages at or adjacent their open ends and arranged to retain fluid in the passages by capillary action.

The invention may be performed in many ways but one embodiment will now be described by way of example with reference to the accompanying drawings, in which.

In the arrangement to be described the coupling for twin fluid lines is provided between a tractor and a trailer vehicle.

One of the fluid lines carries hydraulic fluid for operating the trailer brakes and is connected to a hydraulic system on the tractor which operates the tractor brakes the system being such that high-pressure fluid is allowed into the trailer brake system when the tractor brakes are applied. The other fluid line is connected to a pressure pump on the tractor and supplies pressure fluid to a hydraulic accumulator carried on the trailer and from which high-pressure fluid is drawn to operate the trailer brakes.

The coupling comprises cooperating first and second parts, the first part being connected to the twin fluid lines on the tractor vehicle and the second part being connected to the twin fluid lines on the trailer.

Figure 1:
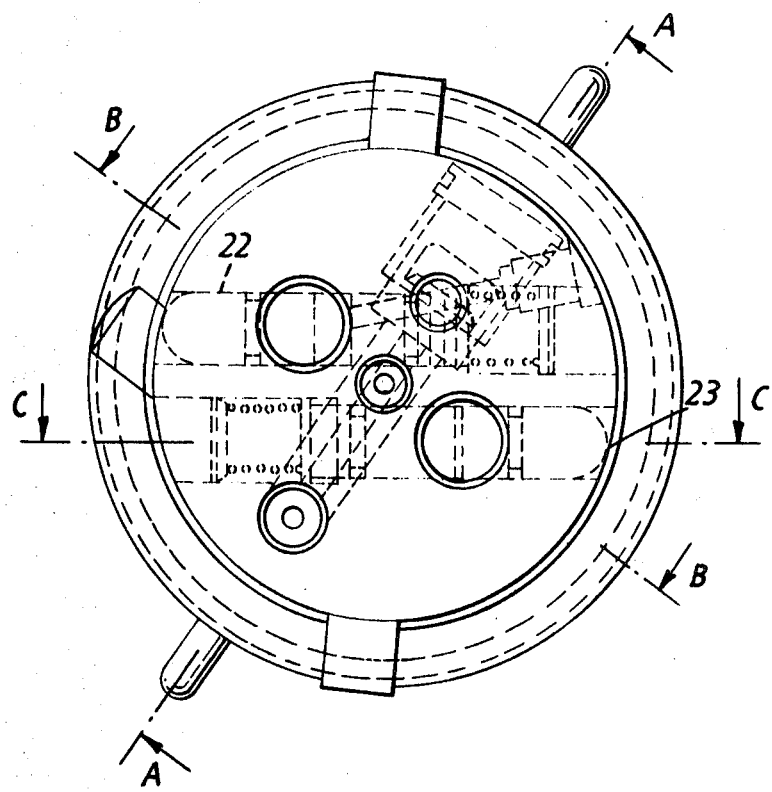
FIG. 1 is an end view of a coupling according to the invention.

The first part comprises a housing in the form of a cylindrical member 10 one end 11 of which is counterbored at 12 to provide a horizontally extending flange 13 which is formed with a series of peripheral holes 14 for locating a ring of steel balls 15. The member 10 is cut back behind the flange so that the outer diameter of the flange 13 is of greater diameter than the remainder of the housing indicated at 16. Within the housing are provided two fluid passages 17 and 18 which lead respectively to a pair of parallel transversely extending galleries 20 and 21. These galleries, the axes of which are displaced from the longitudinal axes of the housing are each formed as a bore, and one end portion of which is of smaller diameter than the remainder, the configuration being such that the two smaller end portions are displaced longitudinally from each other as shown in FIG. 1.

Figure 4:
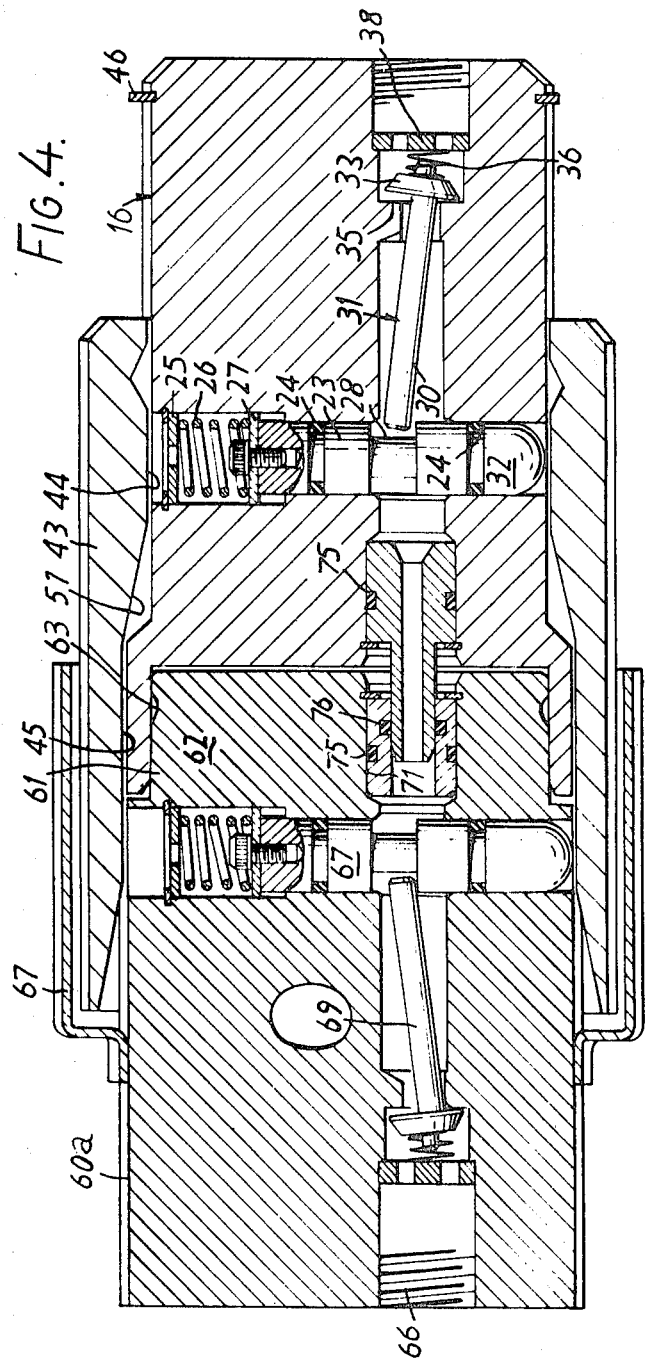
FIG. 4 is a section on the line C—C of FIG. 1.
Figure 5:
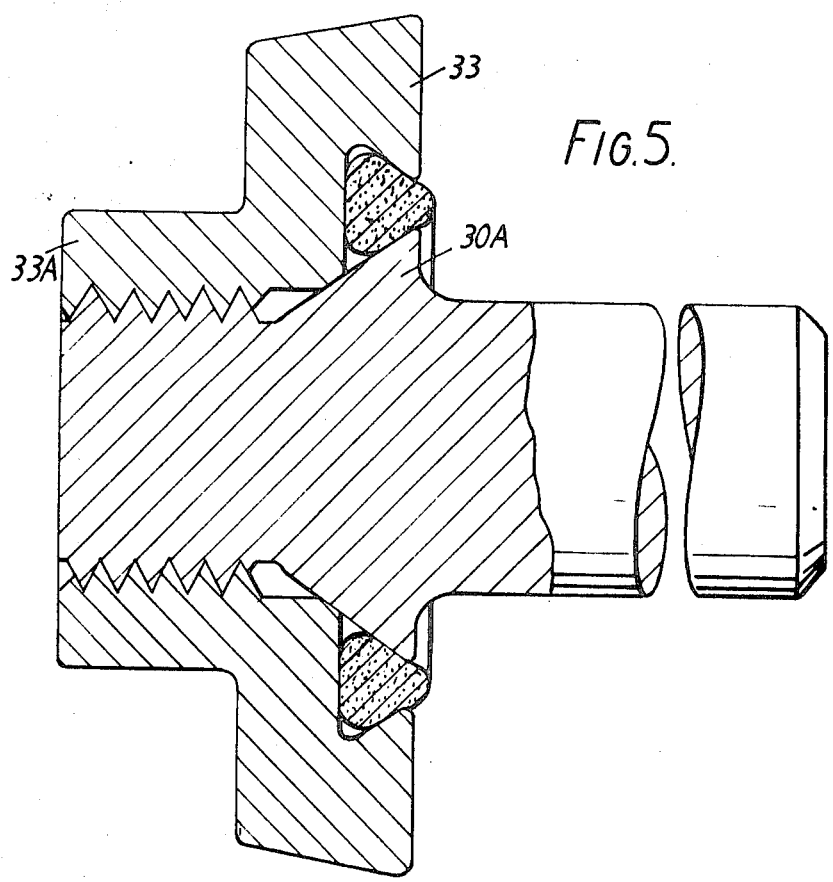
FIG. 5 is a cross section through a tilt valve used in the coupling.
Figure 6:
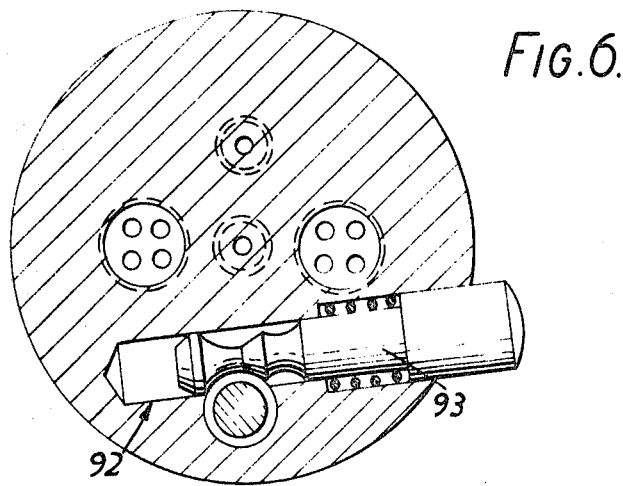
FIG. 6 is a section on the line D—D of FIG. 2.

Mounted to slide within the bores 20 and 21 are valve plungers 22 and 23 operating tilt valves, the plunger 23 and its associated tilt valve being shown more clearly in FIG. 4 and as the other plunger and tilt valve are similar only the plunger 23 and its tilt valve will be described. The plunger 23 is in the form of a spool having appropriate sealing rings 24, and is retained in the bore by means of an end plug 25 in the large diameter portion of the bore and which acts against the valve spool by means of a compression spring 26 which bears on an enlarged washer 27 secured to the end of the valve spool. The portion of the spool between the sealing members 24 is provided with a reduced diameter part 28 within which is received the stem 30 of a tilt valve indicated generally at 31 and more fully described hereafter. Also formed integrally with the spool 23 is a projection 32 the length of which is such that it will project outwardly from the wall of the housing when the springs are extended and the valve spool is against the stop provided by the enlarged washer 27 bearing against the step in the bore between the enlarged and smaller diameter portions. The tilt valve shown in FIG. 4 is shown more clearly in FIG. 5 and comprises, in addition to the stem 30, an outwardly directed flange 33 forming the valve head and which has an axially extending portion 33A which is secured to the outer end of the valve stem. In addition, a flexible sealing ring 34 is retained under compression between the valve head 33 and a projecting portion 30A of the valve stem and arranged so that it stands slightly proud of the face of the valve head 33, and acts to seal the valve head when it seats against a valve seat indicated at 35 in FIG. 4. The valve head is biassed into a central closed position by means of a compression spring 36 which engages around the portion 33A of the valve head. The other end of the compression spring 36 is retained by a spider 38 which permits fluid to flow freely past it.

Thus with the plunger 23 in the position shown in FIG. 4 the valve stem 30 is tilted and the valve is lifted from its seat so as to allow fluid to flow therethrough into the passage 18.

Extending from the other side of the galleries 20 and 21 are two further fluid passages 40 and 41 which lead to points within the counterbore which provides the flange at the end of the housing.

Figure 2:
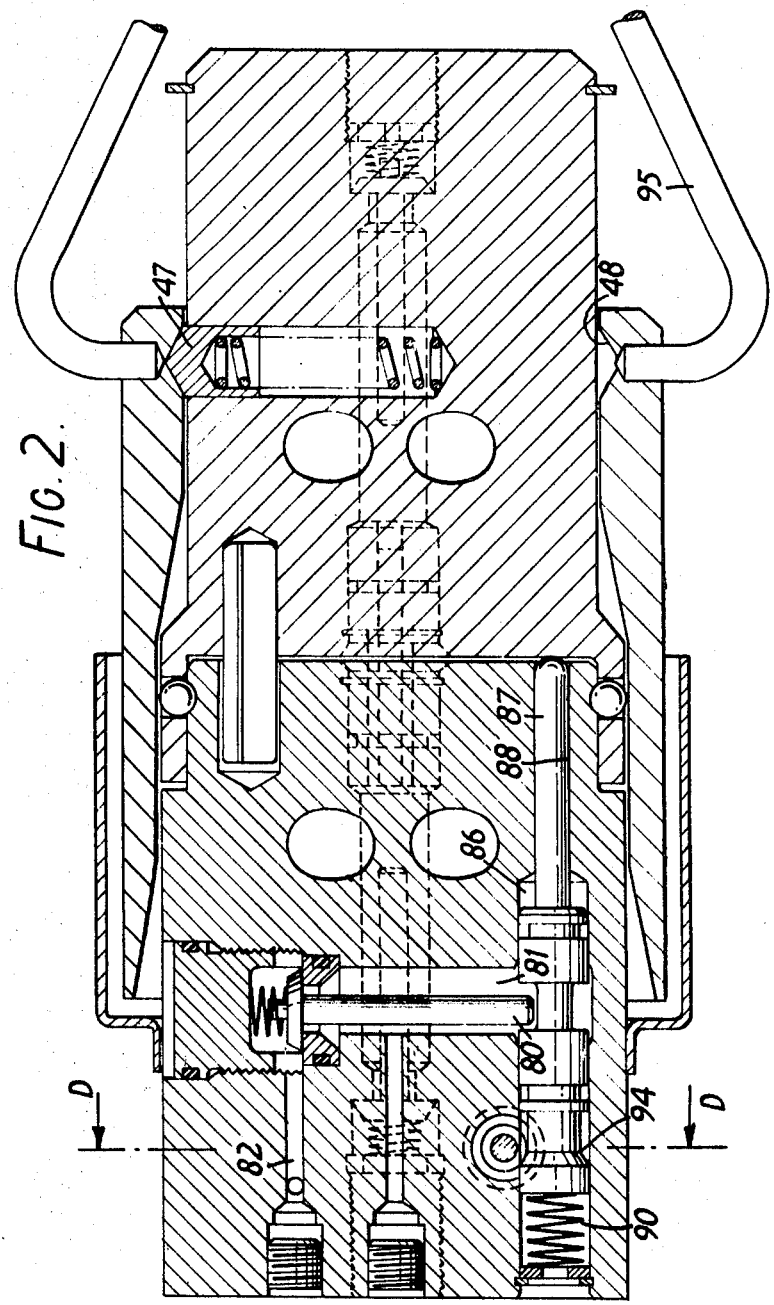
FIG. 2 is a section on the line A—A of FIG. 1.
Figure 3:
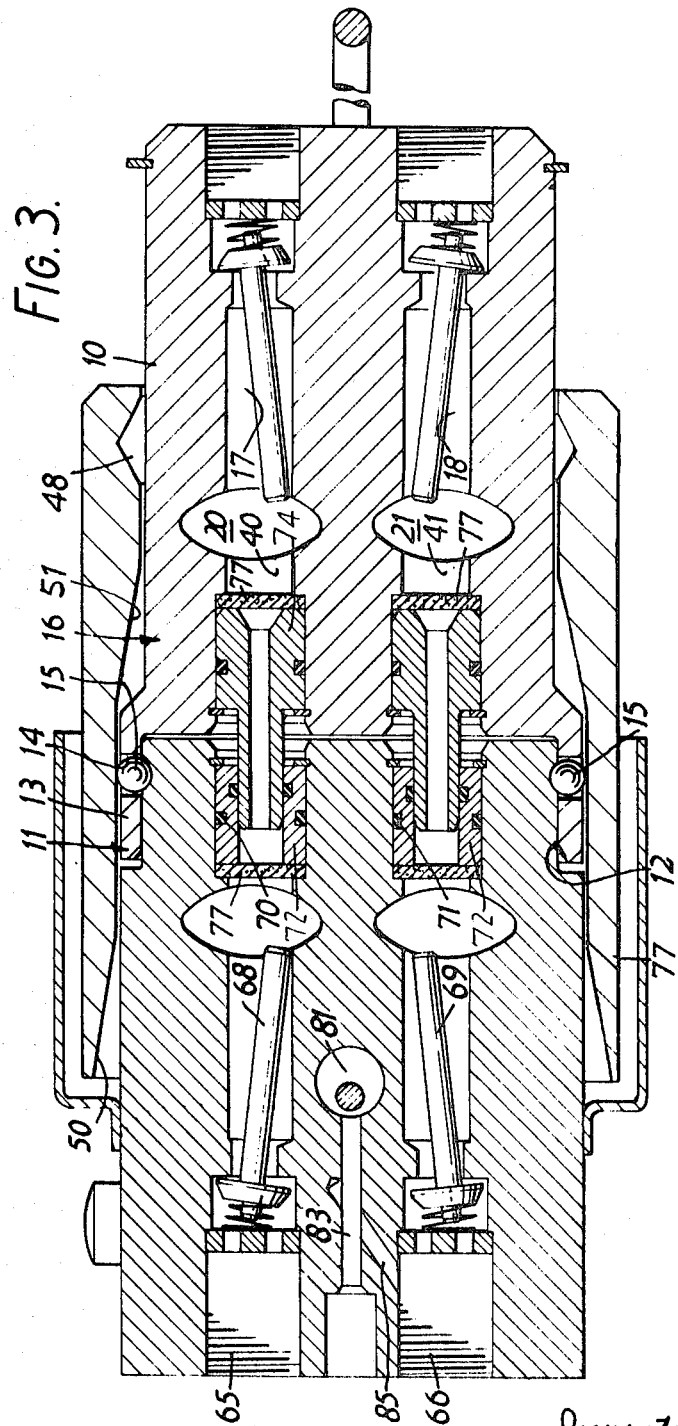
FIG. 3 is a section on the line B—B of FIG. 1.

A sleeve 43 is carried on the outer wall of the housing 16 the sleeve 43 having a narrow bore 44 which is the same as the outer diameter of the housing 16 and so that the sleeve can slide thereon. The sleeve 43 also has a larger diameter bore 45 to clear the flange 13 on the end of the housing and the length of the relative bores is such that when the sleeve is moved to its furthermost position towards the flange it projects somewhat beyond it. A clip 46 is arranged to surround the end of the housing remote from the flange to limit the movement of the sleeve 43. Also carried within the housing is a spring loaded plunger 47 (FIG. 2) which extends radially outwardly from the wall of the housing. This plunger cooperates with a groove 48 provided in the narrow bore of the sleeve and as the plunger is chamfered it acts to locate the sleeve in an operational position. The outer end of the larger diameter bore of the sleeve is chamfered at 50 to provide an inclined surface as is the step 51 in the bore between the large and narrow diameter portions.

The two projections 32 on the plungers 22 and 23 for the valves project from the housing wall and can thus be engaged by the inclined surface 51 at the end of the narrow portion of the bore on the sleeve. When thus engaged they are forced inwardly against the springs 26 and thus cause the tilt valves to move to positions in which the fluid passages are opened. The configuration of the valve plungers is such that they are balanced and are subjected to the minimum hydraulic loading at time of opening.

The second coupling part is formed as a male part to cooperate with the female part provided by the flange 13 on the first part. This second part therefore comprises a cylindrical housing 60 the outer diameter of which is the same as the outer diameter of the flange 13 on the first part but which is stepped at one end 61 to provide a boss 62 which can fit within the counterbore 12 inside the flange 13 in the first part. This boss is formed with a peripherally extending groove 63 into which the balls 15 carried by the flange 13 can fit when the sleeve 43 is moved over them to force them inwards. Thus, with the sleeve in this position the two parts are locked together.

This second part which is intended to be connected to the trailer also has two fluid passages 65 and 66 which emerge at the end longitudinally displaced from the boss 62 and are provided with appropriate connecting means for the fluid lines concerned. A pair of plungers, only one of which is shown at 67 operating tilt valves 68 and 69 and similar to those described in relation to the first part, are again provided, in this case however, the plungers are somewhat longer due to the increased diameter of the second housing, the plungers being arranged to project from the housing close behind the boss. In order to protect the plungers from damage a shroud 67 a is connected to the outer wall of the housing which extends over them, the diameter of the shroud being such that the sleeve 43 can move within it.

Each of the fluid lines 65 and 66 emerge through the face of the boss 62 through enlarged bores 70 and 71 each of which is provided with a socket 72 adapted to receive a probe in the form of a cylindrical member having a bore and projecting from a carrier 74 secured in the end of each of the passages 40 and 41. The probes and sockets which are of different diameters are provided with sealing rings 75, 76 to ensure that there is no leakage when the coupling is engaged. Thus, the two parts can only be fitted together in a predetermined manner. If they are placed together in the wrong way the large prove will not enter the bore for the smaller probe. Porous discs 77 may be provided at the ends of the sockets and carriers, and when the two parts of the coupling are separated prevent, by capillary action, spillage from the fairly long passages in front of the valve seats.

When the two parts of the coupling are put together therefore they are engaged in their correct manner and the boss 62 enters the counter bore 12 within the flange 13. The balls 15 enter the groove 63 in the boss 62 and the movement of sliding the sleeve over the balls towards the operational position will lock the coupling together. Further movement of the sleeve 43 in the same direction now causes the inclined end 50 of the sleeve to engage the valve-operating plungers on the second member and at the same time, or shortly afterwards the inclined surface in the sleeve bore engages the operating plungers for the valves in the first member. Further movement of the sleeve to full operational position now opens all valves so that fluid can flow from the tractor to the trailer.

To disconnect the coupling a similar sequence takes place but in reverse, the valves first being allowed to close before the coupling is unlocked.

The second member also carries a tilt valve 80 for interconnecting the two fluid lines 65 and 66 therein. This interconnecting valve 80 is provided in a transversely extending gallery 81, and seats so as to shut off a passage 82 communicating with the passage 65 from a passage 85 communicating with the passage 66. The tilt valve 80 is operated by a plunger which moves in a gallery provided by a longitudinally extending bore in the housing and this bore is extended through a narrow portion 87 to provide a mounting for a longitudinally extending probe 88 which extends outwardly from the front fact of the boss 62. The spool is appropriately spring loaded by a spring 90 so that when the parts are connected the probe is moved rearwardly and the valve is closed. This will be the normal operating position and fluid can thus be supplied from the high- and low-pressure pipe lines on the tractor as desired. If the coupling is accidentally broken and the parts separated the interconnecting valve 80 will immediately be opened so that high pressure fluid from the high pressure line and provided from the hydraulic accumulator on the trailer flows into the lower pressure system provided for the brakes and the brakes on the trailer will immediately be locked on.

When the coupling is broken normally the brakes will again be locked on due to the action of this valve and in order to allow the trailer to be moved on override device 92 is provided in the form of a spring-loaded plunger 93 which extends from the sidewall of the second member. This plunger extends inwardly to the plunger operating the valve 80 which is provided with an appropriate abutment flange 94. The arrangement is such that when the probe is retracted and the valve is closed the override plunger can be depressed and its lower end will engage behind the flange 94 to move the plunger into a position closing the valve 80. If the coupling is now broken the plunger, manually held, will prevent the interconnecting valve from opening and the trailer brakes will therefore be held off.

The second part is carried on the trailer on a pivot having a vertical axis and the twin passages are arranged to leave the second part at positions at one above the other. Thus fluid lines will be displaced vertically and the relative movement between the trailer and the tractor will not cause entanglement or strain upon the lines concerned. The first part is connected to the tractor through a yoke 95 which is fastened to the sleeve 43 and a chain. Thus, the coupling can be broken by pulling on the chain which will move the sleeve to its withdrawn position. Moreover, if the coupling is inadvertently broken the chain will prevent strain coming on the fluid lines connected to the first part, the chain acting to disconnect and unlock the coupling.

It will be appreciated that the coupling can be broken with little loss of fluid and in any emergency or at any other time the brakes to the trailer will be automatically applied.

What I claim as my invention and desire to secure by Letters Patent of the United States is:

1. A coupling for connecting fluid lines comprising first and second cooperating parts and means for locking the parts together, each part having at least one fluid passage therein, a sealing valve in each of the said passages, each sealing valve comprising a tilt valve actuated by plunger means, and sleeve means movable after the parts have been locked together to actuate the plungers to open the valves, said sleeve means having inclined faces in its bore engaging and operating the plungers.

2. A coupling as claimed in claim 1 in which the axes of the plungers extend substantially transversely across the housing.

3. A coupling as claimed in claim 2 in which the stem of the tilt valve is received in a recess in a spool connected to the plunger.

4. A coupling as claimed in claim 1 in which the cooperating parts are male and female, the locking means includes movable locking members on the female part interlockingly engageable with said male part, and said sleeve is movable to hold said locking members in positions in which they engage the male part.

5. A coupling as claimed in claim 4 in which the locking members are in the form of locking balls which are carried in an engagement flange on the female part, and from both sides of which they project to enable engagement by the sleeve and with the male part respectively.

6. A coupling as claimed in claim 1 including means for locating the sleeve in a position in which it holds the valves open and also in a withdrawn inoperative position in which the valves and the locking members are free of said sleeve.

7. A coupling as claimed in claim 1 in which the sleeve extends over and protects the plunger in the part on which it is provided when it is in a withdrawn inoperative position.

8. A coupling as claimed in claim 1 in which the part on which the sleeve is not provided has a shield which extends over the plunger in the associated part and within which the sleeve can slide in its operative positions.

9. A coupling as claimed in claim 1 in which there are two of said fluid lines in each of said parts, and at least one of the cooperating parts has means for interconnecting the two fluid passages therein.

10. A coupling as claimed in claim 9 in which said means for interconnecting the two fluid passages include a further valve, and means for actuating said further valve when the coupling between the parts is made.

11. A coupling as claimed in claim 10 in which said further valve is normally open and is closed when the parts are connected.

12. A coupling as claimed in claim 11 including manually operable means for holding said further valve closed when the parts are disconnected.

13. A coupling as claimed in claim 9 in which the part having means for interconnecting the fluid passages therein is adapted to be mounted on a trailer in a manner wherein the interconnection of the fluid passages will cause the brakes of the trailer to be applied.

14. A coupling as claimed in claim 1 in which means are provided for preventing or restricting spillage of fluid from the open ends of the fluid passages beyond the sealing valves.

15. A coupling as claimed in claim 14 in which the spillage restricting means comprise porous discs situated in the fluid passages at or adjacent their ends and arranged to retain fluid in the fluid passages by capillary action.

16. A coupling as claimed in claim 1 in which the part on which the sleeve is not provided has a shield which extends over the plunger in the associated part and within which the sleeve can slide in its operative positions.

17. A coupling assembly for releasably interconnecting at least two fluid passages individually subjectable to high pressures prior to being interconnected, said coupling assembly comprising first and second coupling bodies having aligned ones of said fluid passages therein, said bodies having cooperating means thereon for locking said bodies together and sealing means for joining said fluid passages together in sealed relation when said bodies are locked together, a sealing valve within each of said fluid passages within said bodies sealing said fluid passages against the outflow of fluid under pressure, and single manually operable means operable for first assuring the locking together of said bodies with said aligned fluid passages being in interconnected sealed relation and thereafter moving said sealing valves to fluid passage opening positions, said single manually operable means being in the form of a sleeve carried by one of said bodies in telescoped relation and being axially movable into telescoped overlapping relation to the other of said bodies after said bodies have been brought together in fluid passage connecting and sealing relation, said sleeve having a first inclined face for first assuring locking together of said bodies and thereafter opening the sealing valve of said other body, and a second inclined face for opening the sealing valve of said one body simultaneously with the opening of said sealing valve of said one body.

18. The coupling assembly of claim 17 wherein each sealing valve is in the form of a tilt valve and has an operator in the form of a plunger shiftable by said single manually operable means.

19. The coupling assembly of claim 18 wherein each tilt valve has a valve stem extending longitudinally of the associated one of said fluid passages and the associated one of said plungers extending transversely of the respective fluid passage whereby a maximum mechanical advantage may be obtained.

20. The coupling of claim 18 wherein each tilt valve includes an elongated valve stem and a separate removable head, said removable head having a socket formed therein, and a resilient sealing ring removably retained within said socket and projecting beyond said head for sealed engagement with a seating surface.